US009733545B2

(12) United States Patent
Belkin et al.

(10) Patent No.: US 9,733,545 B2
(45) Date of Patent: Aug. 15, 2017

(54) NONLINEAR METASURFACES BASED ON PLASMONIC RESONATORS COUPLED TO INTERSUBBAND TRANSITIONS

(71) Applicant: Board of Regents, The University of Texas System, Austin, TX (US)

(72) Inventors: Mikhail Belkin, Austin, TX (US);
Andrea Alu, Austin, TX (US);
Jongwon Lee, Austin, TX (US);
Mykhailo Tymchenko, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 201 days.

(21) Appl. No.: 14/814,176

(22) Filed: Jul. 30, 2015

(65) Prior Publication Data

US 2017/0097558 A1    Apr. 6, 2017

Related U.S. Application Data (60) Provisional application No. 62/030,967, filed on Jul. 30, 2014.

(51) Int. Cl.
| | |
|---|---|
| *G02F 1/01* | (2006.01) |
| *G02F 1/23* | (2006.01) |
| *G02F 1/355* | (2006.01) |
| *G02F 1/35* | (2006.01) |
| *G02F 1/017* | (2006.01) |

(52) U.S. Cl.
CPC ............ *G02F 1/3556* (2013.01); *G02F 1/017* (2013.01); *G02F 1/3501* (2013.01);
(Continued)

(58) Field of Classification Search
CPC .. G02F 1/017; G02F 1/01708; G02F 1/01716; G02F 1/35; G02F 1/3501;
(Continued)

(56) References Cited

U.S. PATENT DOCUMENTS

| | | | | |
|---|---|---|---|---|
| 5,359,617 A | * | 10/1994 | Kano .................... | B82Y 20/00 372/44.01 |
| 5,381,260 A | * | 1/1995 | Ballato ................. | B82Y 20/00 257/14 |

(Continued)

OTHER PUBLICATIONS

Lee et al., "Giant Nonlinear Response from Plasmonic Metasurfaces Coupled to Intersubband Transitions," Nature, vol. 511, Jul. 3, 2014, pp. 65-69.

(Continued)

*Primary Examiner* — Loha Ben
(74) *Attorney, Agent, or Firm* — Baker Botts L.L.P.

(57) ABSTRACT

A nonlinear metasurface structure including a multi-quantum-well layer designed for a nonlinear response for a desired nonlinear optical process and an array of nanoantennas coupled to the intersubband transitions of the multi-quantum-well layer. Each nanoantenna in the array is designed to have electromagnetic resonances at or close to all input and output frequencies of a given nonlinear optical process. Nanoantennas allow efficient coupling of any incident and outgoing light polarizations to intersubband transitions. Nanoantennas may further provide significant field enhancement in the multi-quantum-well layer. As a result, the nonlinear metasurface structure can be designed to produce a highly nonlinear response for any polarization and angle of incidence of incoming and outgoing waves in a nonlinear optical process. Due to their very larger nonlinear response, efficient frequency conversion can be produced in these metasurfaces without the stringent phase-matching constraints of bulk nonlinear crystals.

18 Claims, 9 Drawing Sheets

(52) U.S. Cl.
CPC ............. *G02F 2001/01775* (2013.01); *G02F 2001/3505* (2013.01); *G02F 2001/3507* (2013.01); *G02F 2202/108* (2013.01); *G02F 2202/30* (2013.01); *G02F 2203/10* (2013.01)

(58) Field of Classification Search
CPC ......... G02F 1/3556; G02F 2001/01725; G02F 2001/01775; G02F 2001/3505; G02F 2001/3507; G02F 2202/108; G02F 2202/30; G02F 2203/07; G02F 2203/10; B82Y 20/00
USPC ....... 359/107, 238, 245–248, 257, 278, 279; 372/44.01, 45.01; 250/208.2
See application file for complete search history.

(56) References Cited

U.S. PATENT DOCUMENTS

| 7,974,325 | B2* | 7/2011 | Belkin | B82Y 20/00 |
|---|---|---|---|---|
| | | | | 372/45.01 |
| 8,283,619 | B2* | 10/2012 | Novack | H01Q 1/248 |
| | | | | 250/208.2 |
| 2014/0085693 | A1* | 3/2014 | Mosallaei | G02B 1/002 |
| | | | | 359/107 |
| 2016/0087143 | A1* | 3/2016 | Teo | H01L 33/06 |
| | | | | 257/13 |

OTHER PUBLICATIONS

Lee et al., "Ultrafast Electrically Tunable Polaritonic Metasurfaces," Advanced Optical Materials, vol. 2, 2014, pp. 1057-1063.

Lee et al., "Metamaterials Based on Intersubband Polaritons," 7th International Congress on Advanced Electromagnetic Materials in Microwaves and Optics—Metamaterials 2013, Bordeaux, France, Sep. 16-21, 2013, pp. 382-384.

Lee et al., "Nonlinear Metamaterials Based on Intersubband Polaritons," 7th International Congress on Advanced Electromagnetic Materials in Microwaves and Optics—Metamaterials 2013, Bordeaux, France, Sep. 19, 2013, pp. 1-20.

* cited by examiner

NONLINEAR METASURFACES BASED ON PLASMONIC RESONATORS COUPLED TO INTERSUBBAND TRANSITIONS

CROSS REFERENCE TO RELATED APPLICATIONS

This application is related to the following commonly owned co-pending U.S. patent application:

Provisional Application Ser. No. 62/030,967, "Nonlinear Metasurfaces Based on Plasmonic Resonators Coupled to Intersubband Transitions," filed Jul. 30, 2014, and claims the benefit of its earlier filing date under 35 U.S.C. §119(e).

GOVERNMENT INTERESTS

This invention was made with government support under Grant No. 1348049 awarded by the National Science Foundation, Grant Nos. FA9550-10-1-0076 and FA9550-11-1-0009 awarded by the Air Force Office of Scientific Research and Grant No. N00014-10-1-0942 awarded by the Office of Naval Research. The U.S. government has certain rights in the invention.

TECHNICAL FIELD

The present invention relates generally to optical metamaterials, and more particularly to nonlinear metasurfaces based on plasmonic resonators coupled to intersubband transitions.

BACKGROUND

The field of optical metamaterials has shown exciting advances in recent years, with many demonstrated applications based on their linear interaction with light, including super-resolution imaging and optical cloaking. More recently, optical metamaterials with a tailored nonlinear response have opened new degrees of freedom in metamaterial design, with interesting venues for super-resolution imaging, for performing efficient frequency conversion and optical control with greatly-relaxed phase-matching conditions as well as for optical switching and memories at the nanoscale.

So far, nonlinearities in metamaterials have been mostly realized by exploiting the natural nonlinear response of plasmonic metals or by enhancing the nonlinearity of optical crystals using plasmonic nanoantennas. A different approach to realize a large nonlinear optical response has been put forward by quantum-engineering intersubband transitions in n-doped multi-quantum-well (MQW) semiconductor heterostructures. By controlling the width of wells and barriers in the MQW structures, one can tailor the transition energy and dipole moments between electron subbands so as to maximize the quantum-mechanical expressions for a nonlinear process of choice thereby producing one of the largest known nonlinear responses, up to 6 orders of magnitude larger than that of traditional nonlinear optical materials. Voltage may be used to modify and spectrally tune intersubband nonlinearities and electrical pumping may be used to produce active intersubband structures with full loss-compensation for both second-order and third-order nonlinear processes.

Nonlinear MQW structures have been successfully integrated into waveguide-based systems to produce efficient frequency conversion and have enabled the development of mass-producible room-temperature electrically-pumped sources of THz radiation. Nearly 1% of Second Harmonic Generation (SHG) power conversion efficiency at 8.6 μm fundamental frequency was achieved in waveguides with passive $In_{0.53}Ga_{0.47}As/Al_{0.48}In_{0.52}As$ MQW structures and over 16% power conversion efficiency was theoretically predicted. However, the integration of giant MQW nonlinearities with free-space optics is very challenging because optical transitions between electron subbands are intrinsically polarized along the surface normal to the MQW layers. As a result, traditional nonlinear intersubband MQW systems only interact with the light electric field polarization components normal to the MQW layers and the nonlinear response of the nonlinear intersubband MQW systems vanishes, for example, when input light is incident normal to the MQW layers (in this case, the electric field in the light wave is along the MQW layers).

BRIEF SUMMARY

In one embodiment of the present invention, a nonlinear metasurface structure comprises a multi-quantum-well layer designed for a nonlinear response associated with intersubband transitions in the multi-quantum-well layer for a nonlinear optical process. The nonlinear metasurface structure further comprises one or more arrays of nanoantennas located on top and/or below the multi-quantum-well layer with their electromagnetic resonances coupled to the intersubband transitions of the multi-quantum-well layer. The nanoantennas in the one or more arrays of nanoantennas have resonances approximately equal to input and/or output frequencies of the nonlinear optical process.

The foregoing has outlined rather generally the features and technical advantages of one or more embodiments of the present invention in order that the detailed description of the present invention that follows may be better understood. Additional features and advantages of the present invention will be described hereinafter, which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

In order to overcome the current limitations of nonlinear MQW systems, and further enhance the intersubband nonlinear response, it is proposed herein to combine the MQW layered substrates with suitably designed plasmonic metasurfaces. In the following, it is theoretically and experimentally demonstrated that by combining quantum-electronic engineering of intersubband nonlinearities with electromagnetic engineering of plasmonic nanoresonators, ultrathin, planarized and highly nonlinear optical metasurfaces are produced. This approach allows one to create large-area metasurfaces in which virtually any element of the nonlinear susceptibility tensor may be ad-hoc engineered to have a giant nonlinear response. The impact of these ultrathin devices may be groundbreaking in a variety of fields related to nonlinear optics, including THz generation and detection, phase conjugation and other nonlinear processes.

The present invention discloses a new type of nonlinear optical metasurface based on coupling of electromagnetic modes in plasmonic nanoresonators with intersubband transitions in MQW semiconductor systems optimized for high optical nonlinearity. Unlike traditional MQW systems, the metasurface disclosed in the present invention can provide efficient frequency conversion for any electric field polarization of the input and output beams and provide large-area ultrathin nonlinear optical elements for free-space nonlinear optical setups. Additionally, the nonlinear response of the metasurfaces disclosed herein, may be further enhanced compared to that of bare MQW systems, due to field enhancement provided by the nanoantennas.

Figure 1A:
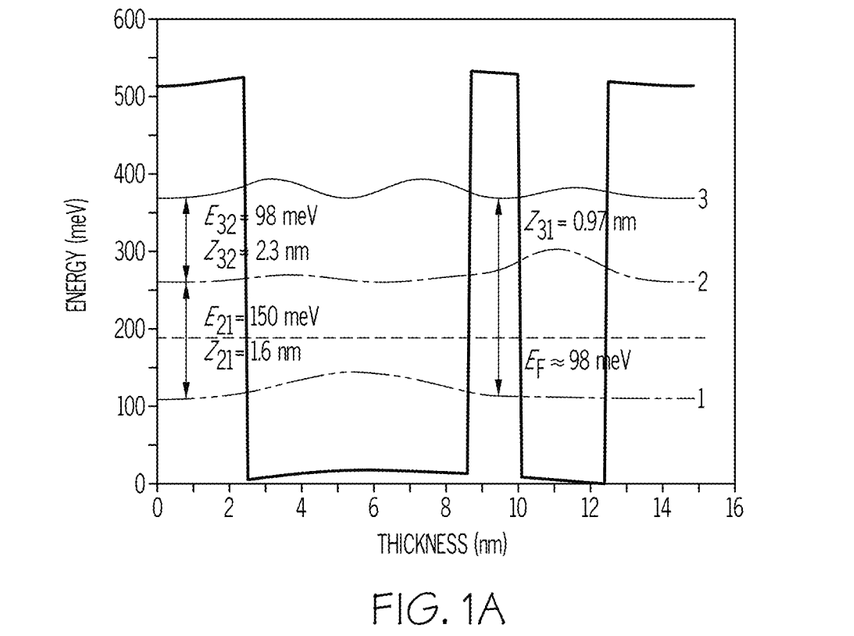
FIG. 1A illustrates the conduction band diagram of an $In_{0.53}Ga_{0.47}As/Al_{0.52}In_{0.48}As$ coupled quantum well structure designed for giant nonlinear response for second harmonic generation at pump wavelength of 9.85 μm that is repeated multiple times to produce a 400-nm-thick multi-quantum-well (MQW) layer in accordance with an embodiment of the present invention.
Figure 1B:
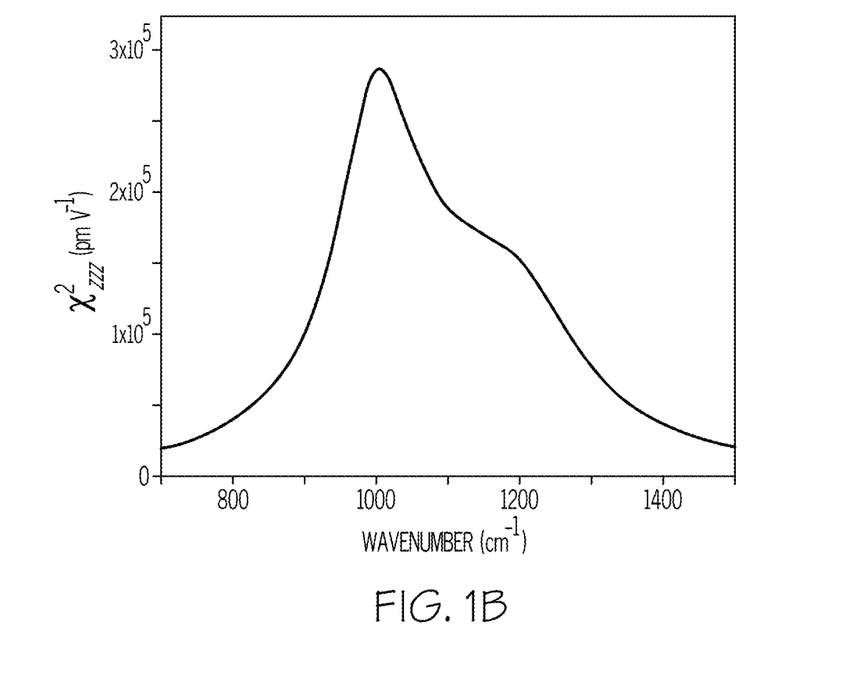
FIG. 1B illustrates a plot of the absolute value of the nonlinear susceptibility tensor element $\omega_{zzz}^{(2)}$, associate with intersubband transitions in the MQW layer, as a function of pump wavenumber (defined as $1/\lambda$, where $\lambda$ is the pump wavelength) for second harmonic generation (SHG) calculated for a bare MQW structure, where direction z is defined to be normal to the semiconductor layers in the MQW structure, in accordance with an embodiment of the present invention.

Referring now to the Figures, FIG. 1A shows the conduction band diagram of an $In_{0.53}Ga_{0.47}As/Al_{0.48}In_{0.52}As$ coupled quantum well structure that is repeated multiple times to produce a 400-nm-thick MQW substrate in accordance with an embodiment of the present invention. Such a structure is designed to support giant resonant nonlinear Second Harmonic Generation (SHG) at $1/\lambda \approx 1015$ cm$^{-1}$ ($\lambda \approx 9.9$ μm or 125 meV photon energy). FIG. 1B plots the absolute value of the nonlinear susceptibility tensor element $\omega_{zzz}^{(2)}$ as a function of pump frequency for SHG calculated for a bare MQW structure in accordance with an embodiment of the present invention. With respect to FIG. 1B, the z-direction is defined to be normal to the MQW layers. The nonlinear response peaks at approximately $2.8 \times 10^5$ pm/V which is 3-4 orders of magnitude larger than the largest $\omega^{(2)}$ coefficient of natural optical materials. Compared to prior MQW structures, such as reported in Lee et al., "Giant Nonlinear Response from Plasmonic Metasurfaces Coupled to Intersubband Transitions," Nature, Vol. 511, Jul. 3, 2014, pp. 65-69, this MQW design has a transition energy between states 1 and 2 purposely detuned from the pump energy to increase the saturation intensity by nearly 7 times. In addition, the doping density is increased almost 10 times in comparison to prior MQW structures to boost the intersubband nonlinearity.

The MQW substrate is first sandwiched between a ground plane and a patterned array of metallic nanoantennas. Designs of some possible nanoantennas are shown in FIGS. 1D and 1E in accordance with an embodiment of the present invention. Prior to discussing FIGS. 1D and 1E, a brief discussion of FIG. 1C is deemed appropriate.

Figure 1C:
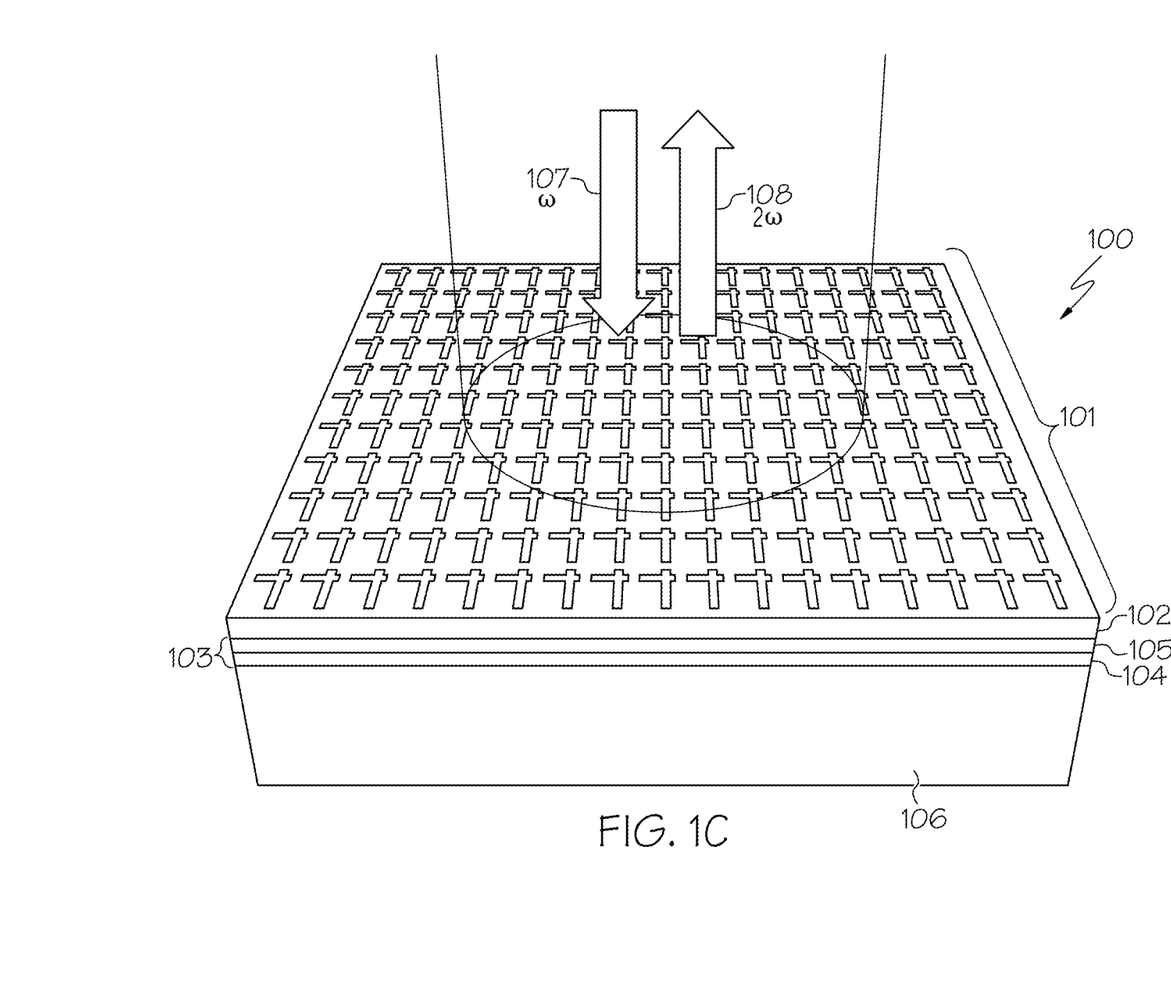
FIG. 1C illustrates a nonlinear metasurface that includes an array of nanoantennas coupled to a MQW layer in accordance with an embodiment of the present invention.
Figure 1D:
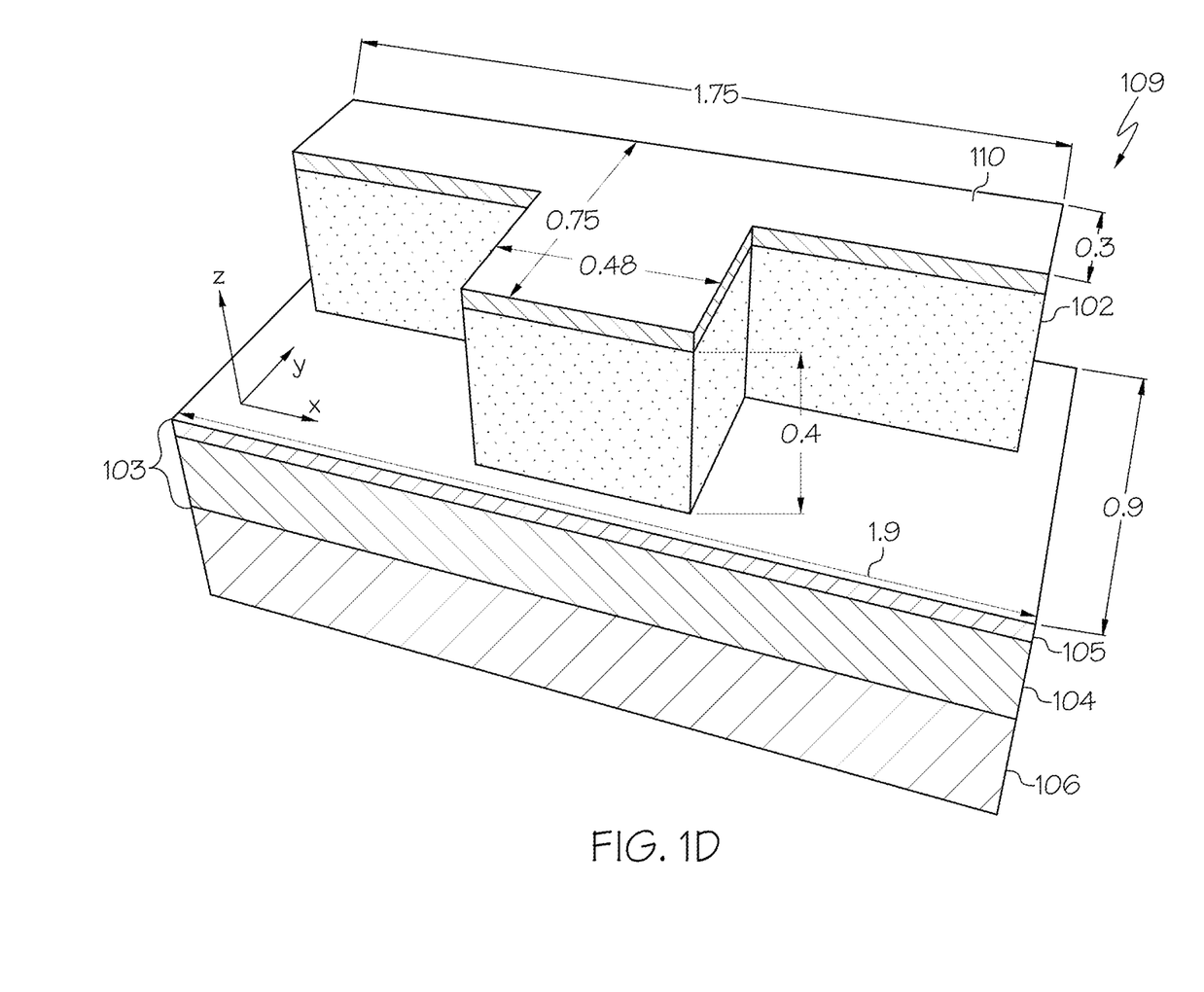
FIGS. 1D and 1E illustrate unit cell designs of the nonlinear metasurface in accordance with an embodiment of the present invention.
Figure 1E:
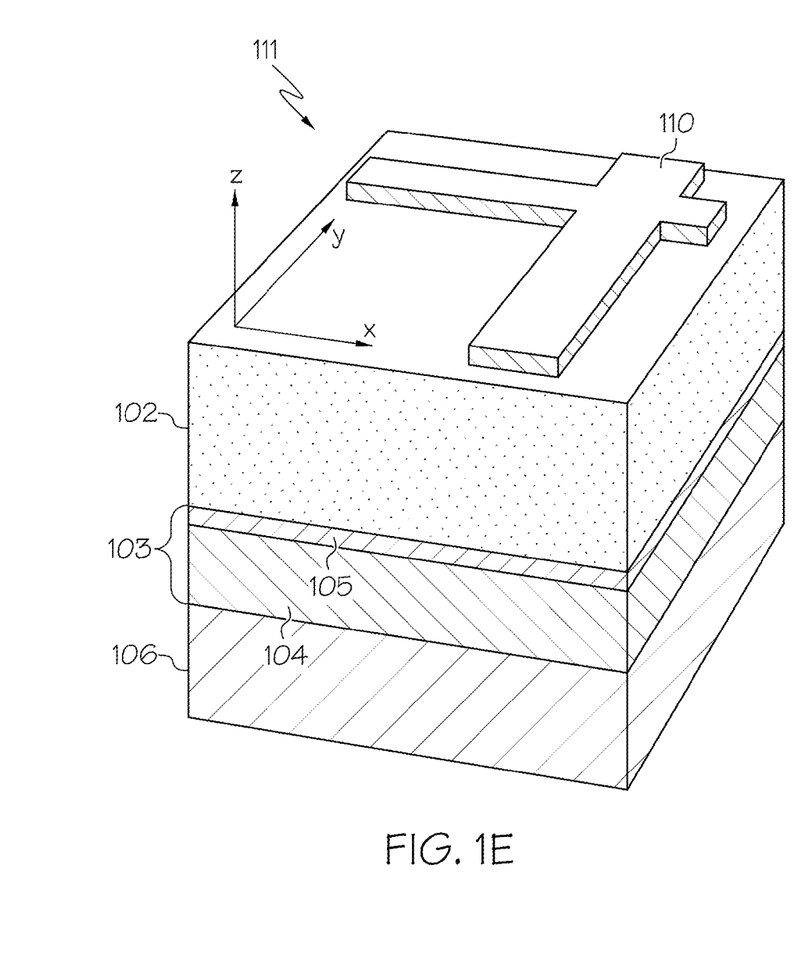

FIG. 1C illustrates a nonlinear metasurface structure 100 that includes an array 101 of nanoantennas (e.g., plasmonic resonators) coupled to a MQW layer 102 (e.g., placed on top of MQW layer 102 or etched into MQW layer 102) designed for a nonlinear response for a nonlinear optical process in accordance with an embodiment of the present invention. FIG. 1C further illustrates that MQW layer 102 is placed on a ground plane 103, consisting of a layer of gold 104 and a layer of platinum 105 on top of the layer of gold. Additionally, FIG. 1C illustrates that ground plane 103 is located on top of a substrate 106 (e.g., InP substrate). In one embodiment, ground plane 103 is made of metal. In another embodiment, ground plane is made of doped semiconductor. In one embodiment, substrate 106 is made of semiconductor or dielectric material. While FIG. 1C illustrates that each of the nanoantennas of the array 101 of nanoantennas as comprising a shape of a Γ-shaped cross (two orthogonal arms connected to each other) (referred to herein as a "nanocross"), the principles of the present invention are not to be limited in scope in such a manner. Each nanoantenna may be configured in other shapes, such as shown in FIG. 1D, where T-shaped nanoantennas are used and furthermore the MQW region outside of the antenna is etched away. The principles of the present invention are to include any configuration for the nanoantenna that allows the resonant electromagnetic modes of metallic nanoantennas to be coupled to the intersubband transitions of the MQW layer as discussed herein. A person of ordinary skill in the art would be capable of applying the principles of the present invention to such implementations. Further, embodiments applying the principles of the present invention to such implementations would fall within the scope of the present invention.

Furthermore, while FIG. 1C illustrates a single array 101 of nanoantennas, the principles of the present invention are to include multiple arrays of nanoantennas, including one or more arrays of nanoantennas being on top and/or below the MQW layer 102 with their electromagnetic resonances coupled to the intersubband transitions of MQW layer 102. A person of ordinary skill in the art would be capable of applying the principles of the present invention to such implementations. Further, embodiments applying the principles of the present invention to such implementations would fall within the scope of the present invention.

Furthermore, in one embodiment, one or more of the multiple arrays of nanoantennas are designed to provide a nonlinear response with a phase-gradient along the nonlinear metasurface.

Additionally, the nanoantennas in these arrays of nanoantennas are designed to have resonances approximately equal to the input and/or output frequencies of a nonlinear optical process. Furthermore, in one embodiment, each of the nanoantennas has the same design, or alternatively, in one embodiment, one or more of these nanoantennas have a different design.

Furthermore, in one embodiment, MQW layer 102 may be composed of individual MQW structures positioned on top of each other. In one embodiment, each of these individual MQW structures is designed to provide a nonlinear response for nonlinear optical processes. In one embodiment, each of these individual MQW structures has the same design. In another embodiment, one or more of these individual MQW structures have a different design.

Additionally, in one embodiment, a voltage is applied across MQW layer 102 to control and shift the resonance frequencies in MQW layer 102 as discussed herein.

Furthermore, as illustrated in FIG. 1C, arrow 107 indicates an incident pump beam at the fundamental frequency ω and arrow 108 indicates the reflected second-harmonic beam at 2ω as discussed further herein.

Referring now to FIG. 1D, FIG. 1D illustrates a metasurface unit cell 109 (i.e., a cell of the array 101 of nanoantennas) in accordance with an embodiment of the present invention. As illustrated in FIG. 1D, metasurface unit cell 109 includes a nanoantenna 110 that is coupled to the intersubband transitions of MQW layer 102 (e.g., placed on top of MQW layer 102 or etched into MQW layer 102), where nanoantenna 110 includes two arms that support two independently tunable plasmonic resonances as discussed further below. In one embodiment, nanoantenna 110 is made of metal or doped semiconductor. In one embodiment, MQW layer 102 includes a coupled quantum well structure that is repeated multiple times. In one embodiment, the thickness of MQW layer 102 is approximately 400 nanometers. In one embodiment, nanoantenna 110 is comprised of gold with a shape of a "T" structure with the dimensions in micrometers as illustrated in FIG. 1D. Furthermore, as illustrated in FIG. 1D, in one embodiment, MQW layer 102 has a height of approximately 0.4 μm.

Additionally, as illustrated in FIG. 1D, MQW layer 102 is placed on top of a ground plane 103 consisting of a layer of gold 104 and a layer of platinum 105 on top of the layer of gold 104. In one embodiment, ground plane 103 is made of an approximately 50 nanometer thick layer of platinum 105 and an approximately 100 nanometer thick layer of gold 104. Furthermore, FIG. 1D illustrates ground plane 103 being located on top of a substrate 106 (e.g., InP substrate). FIG. 1D further illustrates the dimensions in micrometers of the layer of platinum 105 of ground plane 103.

Figure 1F:
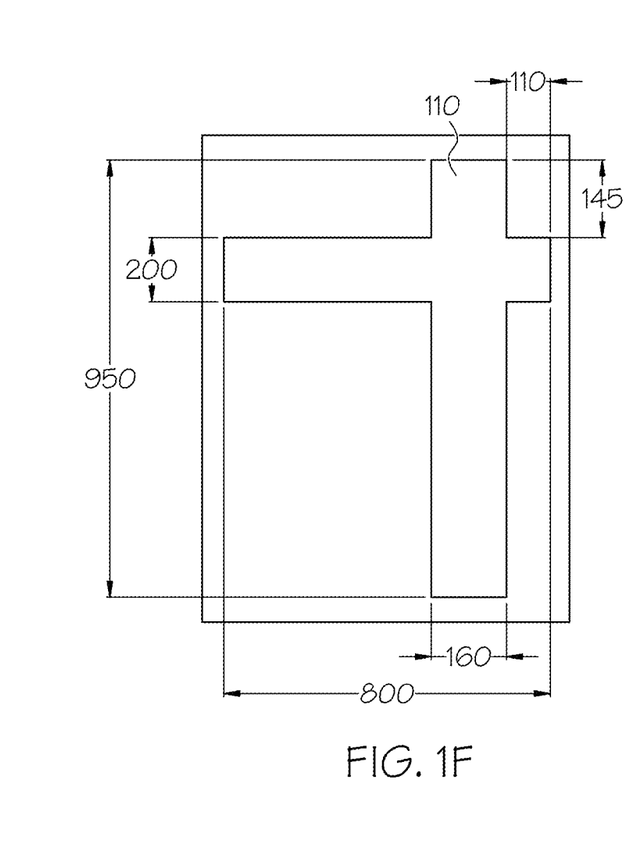
FIG. 1F illustrates the dimensions of the nanoantenna for the metasurface unit cell of FIG. 1E in accordance with an embodiment of the present invention.

FIG. 1E illustrates another embodiment of a metasurface unit cell 111 (i.e., a cell of the array 101 of nanoantennas) in accordance with an embodiment of the present invention with the same structure as the metasurface unit cell 109 of FIG. 1D except that nanoantenna 110 has a shape of a Γ-shaped cross (two orthogonal arms connected to each other) (referred to herein as a "nanocross"). FIG. 1F illustrates the dimensions of nanoantenna 110 for the metasurface unit cell 111 of FIG. 1E in accordance with an embodiment of the present invention.

While FIGS. 1C, 1D and 1E illustrate the utilization of ground plane 103, ground plane 103 may not be necessary to implement the nonlinear metasurface structure of the present invention. In one embodiment, ground plane 103 is used to further couple the resonances of nanoantenna 110 with the resonances of MQW layer 102.

The grounded metasurface of FIGS. 1D and 1E can be designed to enable efficient coupling of plasmonic nanoantenna modes with z-polarized intersubband transitions thereby drastically enhancing light-matter interaction and converting the impinging transverse field polarization to the desired z-direction. As discussed above, even though a ground plane 103 is used in the metasurface design illustrated in FIGS. 1C, 1D and 1E, efficient coupling of intersubband transitions with resonant metallic nanoantennas may also be achieved without using a ground plane.

Figure 2A:
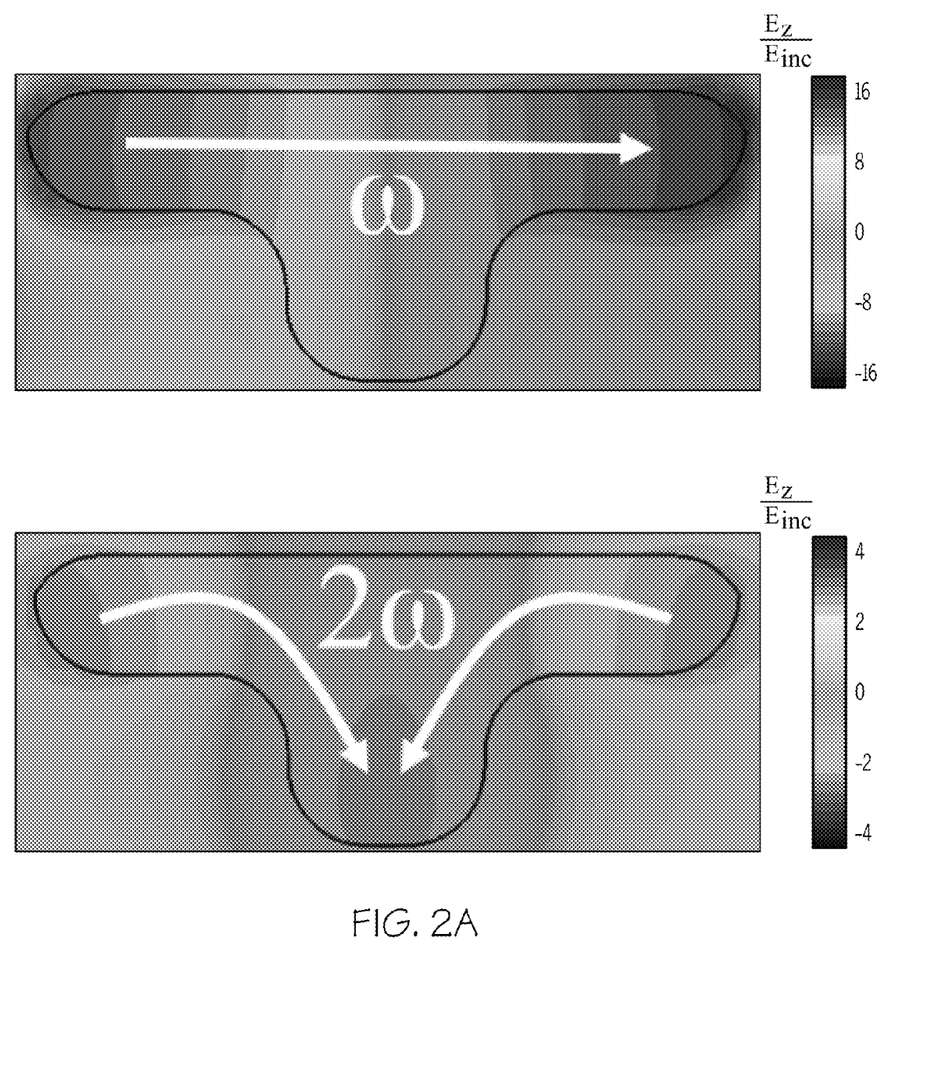
FIG. 2A shows the normalized $E_z$ field component induced in the MQW layer of FIG. 1D for x-polarized fundamental and y-polarized second harmonic (SH) light at normal incidence, where direction x is defined along the long arm of the nanoantenna and direction y is defined along the short arm of the nanoantenna, in accordance with an embodiment of the present invention.

FIG. 2A shows the normalized $E_z$ field component induced in MQW layer 102 of FIGS. 1D and 1E for x-polarized fundamental and y-polarized second harmonic (SH) light at normal incidence, which represents the optimal SHG polarization combination for the metasurface design of the present invention in accordance with an embodiment of the present invention. In connection with FIG. 2A, directions are defined in accordance with the coordinate system depicted in FIG. 1D. The computed fields are normalized to the input (transverse) field amplitude and simulations show up to 16 times local field enhancement in MQW layer 102.

Figure 2B:
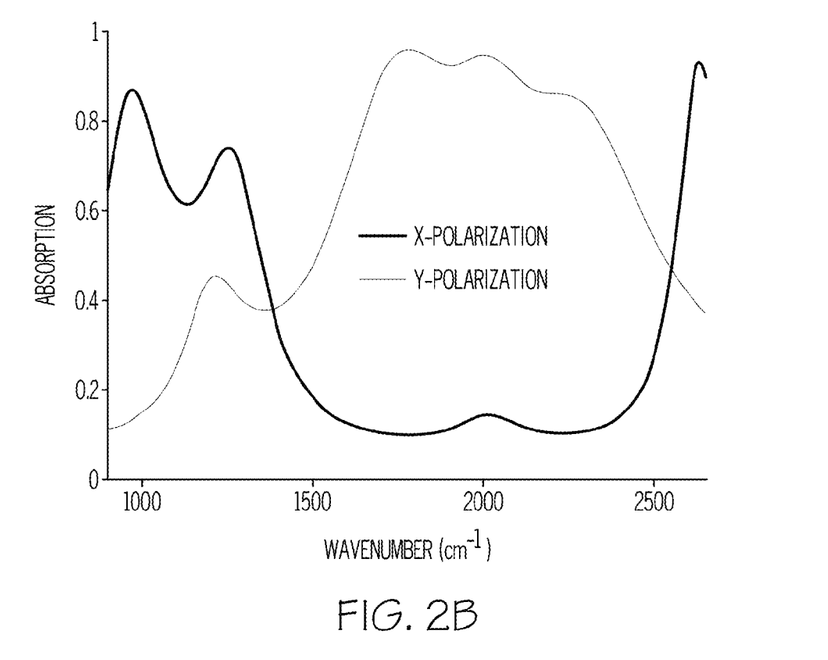
FIG. 2B illustrates the simulated absorption spectrum of the metasurface design of the present invention for different polarizations of the incident light in accordance with an embodiment of the present invention.

FIG. 2B illustrates the simulated absorption spectrum of the metasurface design of the present invention for different polarizations of the incident light in accordance with an embodiment of the present invention. FIG. 2B confirms that the proposed antenna structure possesses strong electromagnetic resonances at the frequencies of interest. The overall nonlinear response of the proposed metasurface can be obtained by computing its nonlinear susceptibility tensor $\chi_{ijk}^{(2)}$ using the overlap integral, as reported in Lee et al., "Giant Nonlinear Response from Plasmonic Metasurfaces Coupled to Intersubband Transitions," Nature, Vol. 511, Jul. 3, 2014, pp. 65-69, $$\chi_{ijk}^{(2)} = \frac{\chi_{zzz}^{(2)}}{V} \int_{UC} \xi_i^{2\omega}(x, y, z) \xi_j^{\omega}(x, y, z) \xi_k^{\omega}(x, y, z) dV, \quad (1)$$

where $\xi_i^{\omega}(\xi_i^{2\omega})$ is the local enhancement of the induced z-polarized E-field in MQW structure 109 (FIG. 1D) normalized to the i-polarized incident wave ω (2ω), and the integration goes over the entire unit-cell MQW volume.

In one embodiment, in contrast to the resonators shown in FIGS. 1E and 1F, which were made by metal patterning on top of a continuous MQW layer, the resonators may be patterned on top of MQW layer 102 and then etched (see FIG. 1D) down to the ground metal, leading to a set of open nanocavities over the metasurface. This solution significantly contributes to enhance the modal overlap integral due to the large contrast between the permittivity of the MQW substrate and the air gaps by (1) improving the uniformity of the induced field distribution in the MQW regions at both fundamental and second harmonic frequencies; (2) concentrating most of the electric field within the nanocavity, and (3) enhancing the maximum local electric field. As illustrated in FIG. 1D, nanocavities with a T-shaped geometry were selected that allows the independent control of the fundamental (long arm along the x-axis) and second harmonic (dipole created between the short and long arm) resonances, as illustrated in FIG. 2A. The adequate combination of all these factors allows a modal overlap integral in Eq. (1), defined as $$\frac{\int_{UC} \xi_i^{2\omega}(x,y,z)\xi_j^{\omega}(x,y,z)\xi_k^{\omega}(x,y,z)\,dV}{V},$$

above 4.25, around 8 times larger than previously obtained by Lee et al., "Giant Nonlinear Response from Plasmonic Metasurfaces Coupled to Intersubband Transitions," Nature, Vol. 511, Jul. 3, 2014, pp. 65-69. Interestingly, this enhancement is realized by removing nonlinear material from the structure to force the modal fields to be more localized within the volume directly underneath the resonator thereby maximizing the overlap at the two frequencies.

Figure 2C:
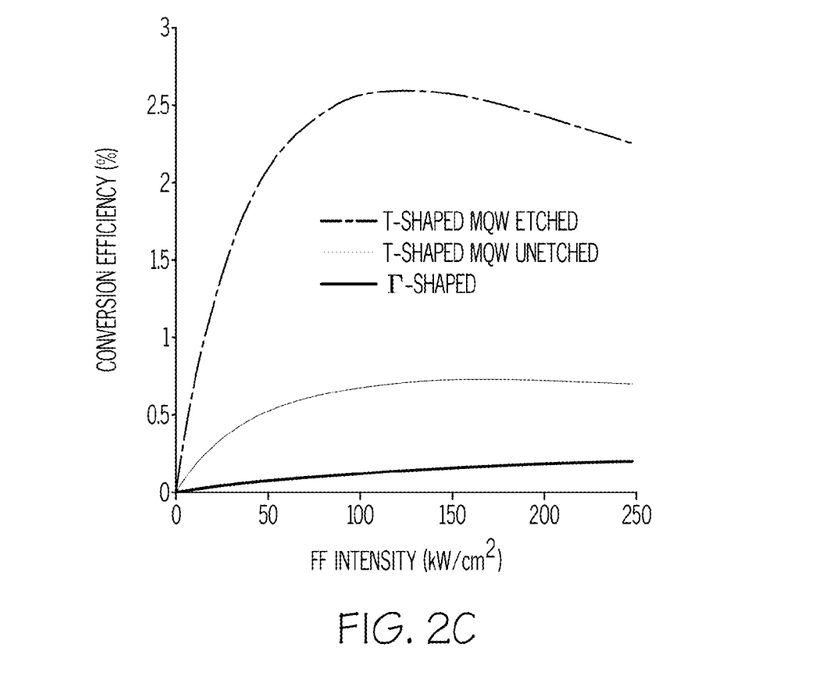
FIG. 2C illustrates the theoretically predicted SHG conversion efficiency as a function of pump intensity for the case of the Γ-shaped resonators shown in FIG. 1E in comparison to the T-shaped geometry illustrated in FIG. 1D with and without etching the MQW layer using the MQW configuration depicted in FIG. 1A and assuming intersubband transition linewidths of 10 meV full width at half maximum in accordance with an embodiment of the present invention.

In order to further highlight the significant improvements on the MQW metasurface design achieved herein, FIG. 2C illustrates the theoretically predicted SHG conversion efficiency as a function of pump intensity for the case of the Γ-shaped resonators previously used by Lee et al., "Giant Nonlinear Response from Plasmonic Metasurfaces Coupled to Intersubband Transitions," Nature, Vol. 511, Jul. 3, 2014, pp. 65-69 and shown in FIG. 1E in comparison to the T-shaped geometry illustrated in FIG. 1D with and without etching MQW layer 102 using the MQW configuration shown in FIG. 1A and assuming all intersubband transition linewidths of 10 meV full width at half maximum (FWHM) in accordance with an embodiment of the present invention. It is noted that transition linewidths of 10 meV FWHM were reported previously in heavily-doped semiconductor heterostructures at room temperature, and even narrower linewidths were reported from heavily-doped MQW structures at cryogenic temperatures. The numerical simulations show that, with the current nanoresonator and MQW designs, the conversion efficiency can reach values above 2.5% in the nonlinear metasurfaces of the present invention.

Figure 3A:
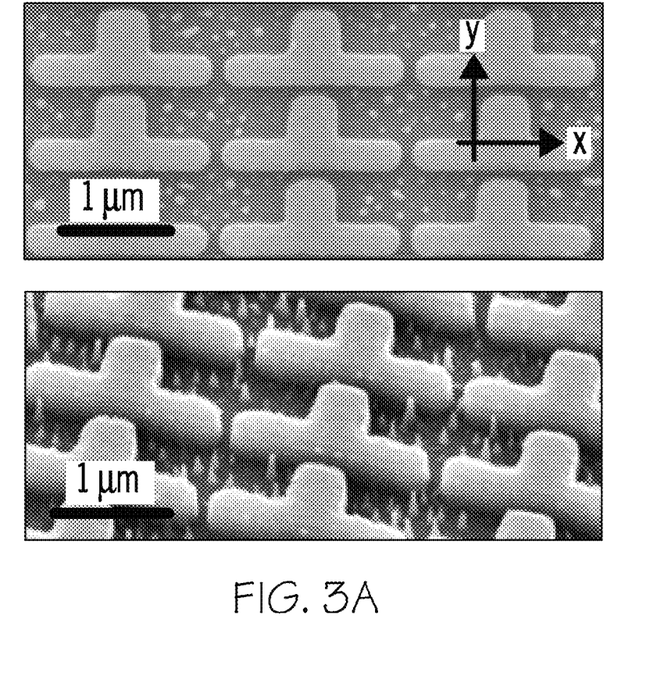
FIG. 3A shows the scanning electron microscope image of the fabricated metasurface in accordance with an embodiment of the present invention.

Experimentally, a wide-area metasurface consisting of multiple repetitions of a 1.9 μm by 0.9 μm metasurface unit cell as illustrated in FIG. 1D was fabricated. FIG. 3A shows the scanning electron microscope image of the fabricated metasurface in accordance with an embodiment of the present invention.

Figure 3B:
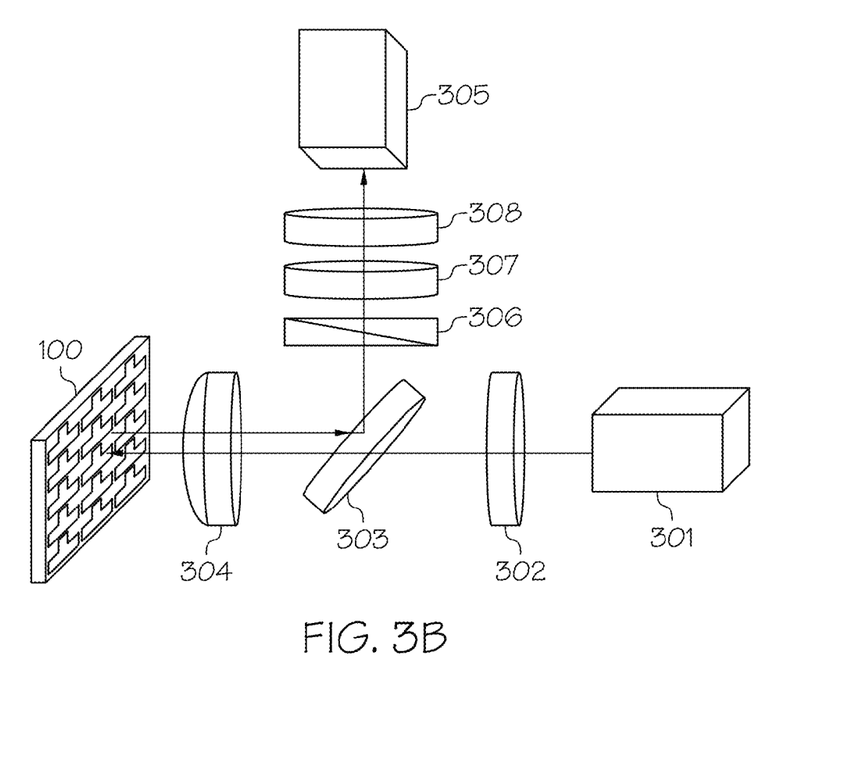
FIG. 3B illustrates the experimental setup for testing the nonlinear response in accordance with an embodiment of the present invention.

The nonlinear response was tested using the experimental setup shown in FIG. 3B in accordance with an embodiment of the present invention. Referring to FIG. 3B, in one embodiment, linearly-polarized light from a tunable quantum cascade laser (QCL) 301 passes through an achromatic half-wave plate (HWP) 302 for polarization control. A long pass filter (LP)/beam splitter 303 is used to remove SHG light coming from the laser 301. Furthermore, a numerical aperture 0.5 collimating lens 304 is used to collimate the light to the sample (metasurface structure 100 of FIG. 1C). SHG output is collected by collimating lens 304 and is directed by beam splitter 303 towards the detector 305 (e.g., InSb detector) through a polarizer 306, a ZnSe lens 307, and a short pass filter (SP) 308 that is used to block the pump.

Figure 3C:
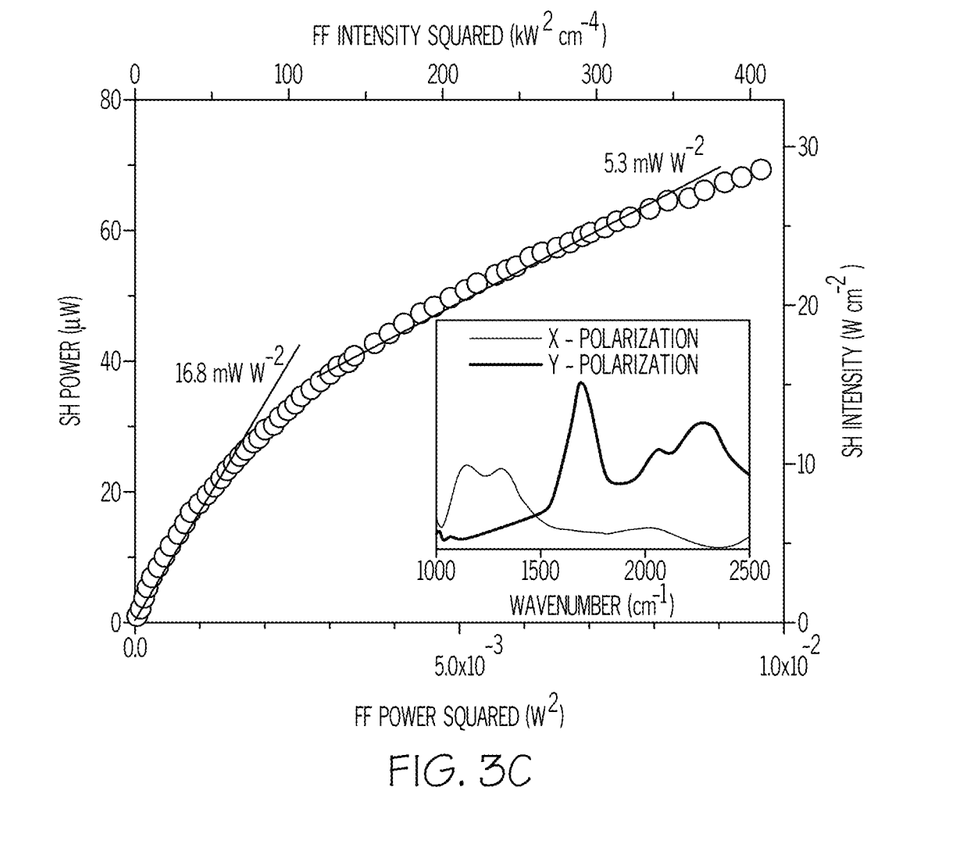
FIG. 3C illustrates the experimentally-measured second harmonic (SH) peak power (left axis) or peak intensity (right axis) as a function of fundamental peak power squared (bottom axis) or peak intensity squared (top axis) at the pump wavenumber of 1015 cm$^{-1}$ ($\lambda_\omega \approx 9.9$ μm) for yxx polarization combination, where the inset of FIG. 3C illustrates the experimentally-measured linear reflection absorption spectra measured for normally-incident x- and y-polarized light, in accordance with an embodiment of the present invention.

The linear reflection absorption spectra measured for normally-incident x- and y-polarized light are shown in the inset of FIG. 3C. FIG. 3C illustrates the SH peak power (left axis) or peak intensity (right axis) as a function of fundamental peak power squared (bottom axis) or peak intensity squared (top axis) at pump wavenumber of 1015 cm$^{-1}$ ($\lambda_\omega \approx 9.9$ μm) for yxx polarization combination in accordance with an embodiment of the present invention.

Referring to the inset of FIG. 3C, strong absorption at fundamental and SH frequency is observed for x- and y-polarized inputs, respectively, in good agreement with theory. FIG. 3C shows SHG peak power as a function of the squared fundamental peak power and peak intensity for yxx polarization combination, where the first letter refers to the polarization of the generated SH beam and the other two refer to the polarization states of the pump beams in accordance with the coordinate system depicted in FIG. 1D. Other polarization combinations provide limited SHG response since the nanoresonators of the present invention only provide strong coupling of incident/outgoing waves to the MQW layer 102 for x-polarized light at the fundamental frequency and y-polarized light at SH frequency. One may expect to observe a linear dependence of SH power on the square of FF power in FIG. 3C. However, the slope of the curve in FIG. 3C changes from 16.8 mW/W$^2$ for low input powers to 5.3 mW/W$^2$ for higher pump power due to intensity saturation.

Figure 3D:
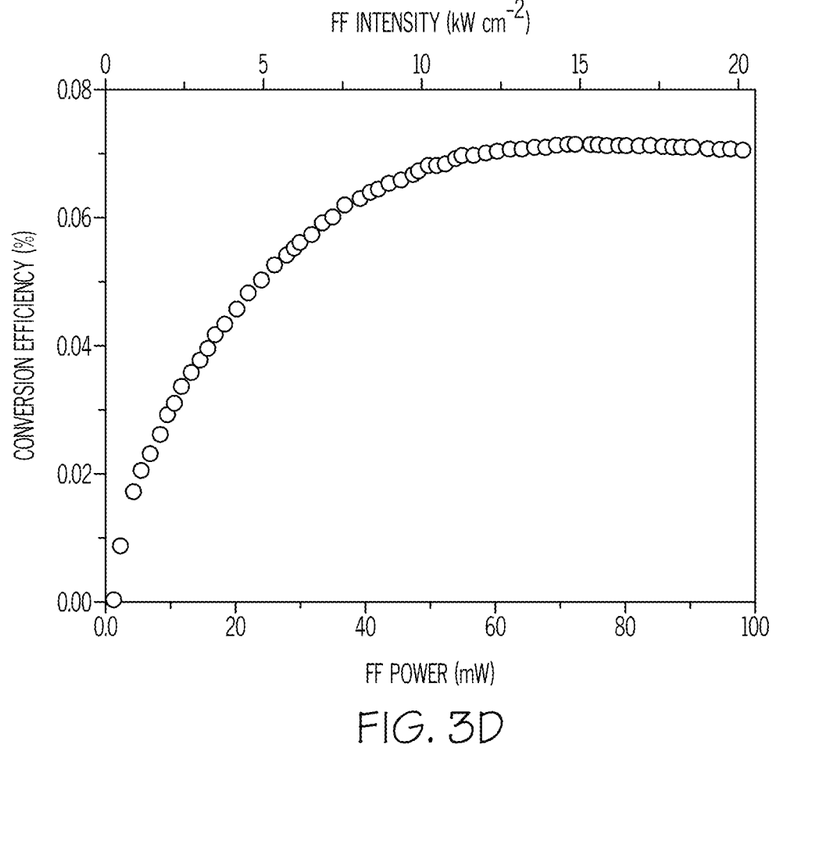
FIG. 3D illustrates the SHG power conversion efficiency as a function of fundamental peak power (bottom axis) or peak intensity (top axis) at the wavenumber of 1015 cm$^{-1}$ for yxx polarization combination in accordance with an embodiment of the present invention.

The experimentally measured SHG power conversion efficiency as a function of pump intensity or pump peak power is shown in FIG. 3D. FIG. 3D illustrates the SHG power conversion efficiency as a function of fundamental peak power (bottom axis) or peak intensity (top axis) at wavenumber of 1015 cm$^{-1}$ for yxx polarization combination in accordance with an embodiment of the present invention.

The value of $\chi_{yxx}^{(2)}$ can be obtained using the data in FIG. 3C. $\chi_{yyy}^{(2)} \approx 1.17 \times 10^6$ pm/V ($0.66 \times 10^6$ pm/V) was obtained for low (high) pump intensity in FIG. 3C. These numbers represent the largest values of second-order nonlinear susceptibility ever recorded in the infrared-visible range in a condensed matter system. Such giant values of optical nonlinearity achieve 0.075% conversion efficiency from a 400 nm-thick MQW layer using pump intensity in the range 10-15 kW/cm$^2$ as shown in FIG. 3D. In comparison, the best traditional nonlinear materials and nonlinear optical metasurfaces in the infrared-visible range demonstrated to date produce at least 8 orders of magnitude smaller conversion efficiency for the same thickness and pump intensity.

Due to their subwavelength thickness, the nonlinear metasurface structure of the present invention (e.g., nonlinear metasurface structure 100 of FIG. 1C) can produce a highly nonlinear response for efficient frequency conversion without the stringent phase-matching constraints of bulk nonlinear crystals. Additionally, the nonlinear metasurface structure of the present invention can be tailored to work with various frequencies from near-infrared to mid-infrared to terahertz, including frequencies for which no convenient traditional nonlinear crystals exist. It can be designed to produce a giant nonlinear response for different nonlinear processes, such as sum and difference frequency generation as well as a variety of four-wave mixing processes.

While the description above focuses on a specific nonlinear optical process of SHG, the present invention is applicable to all other nonlinear optical processes, such as sum- and difference-frequency generation, electro-optic effect, optical phase conjugation, Raman process, four-wave mixing processes, and so on.

Furthermore, the nonlinear metasurface structure, as discussed herein, is optimized for input and/or output beams incident from and/or outcoupled to above and/or below multi-quantum-well layer 102.

Furthermore, the nonlinear metasurface structure of the present invention (e.g., nonlinear metasurface structure 100 of FIG. 1C) may be utilized in various applications, such as frequency doubling, terahertz generation and frequency up or down conversion, and electro-optically tunable metasurfaces.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A nonlinear metasurface structure, comprising:
   a multi-quantum-well layer designed for a nonlinear response associated with intersubband transitions in said multi-quantum-well layer for a nonlinear optical process; and
   one or more arrays of nanoantennas located on top and/or below said multi-quantum-well layer with their electromagnetic resonances coupled to said intersubband transitions of said multi-quantum-well layer, wherein said nanoantennas in said one or more arrays of nanoantennas have resonances approximately equal to input and/or output frequencies of said nonlinear optical process.

2. The nonlinear metasurface structure as recited in claim 1, wherein a nanoantenna in said one or more arrays of nanoantennas has a geometric configuration of one of the following: a T shape configuration and a cross shape configuration.

3. The nonlinear metasurface structure as recited in claim 1, wherein said one or more arrays of nanoantennas comprise nanoantennas with a same design.

4. The nonlinear metasurface structure as recited in claim 1, wherein said one or more arrays of nanoantennas are designed to provide a nonlinear response with a phase-gradient along the nonlinear metasurface structure.

5. The nonlinear metasurface structure as recited in claim 1, wherein said one or more arrays of nanoantennas comprise nanoantennas with a different design.

6. The nonlinear metasurface structure as recited in claim 1, wherein said multi-quantum-well layer comprises multiple individual multi-quantum-well structures positioned on top of each other.

7. The nonlinear metasurface structure as recited in claim 6, wherein said individual multi-quantum-well structures are designed to provide said nonlinear response for nonlinear optical processes.

8. The nonlinear metasurface structure as recited in claim 7, wherein each of said individual multi-quantum-well structures has a same design.

9. The nonlinear metasurface structure as recited in claim 7, wherein one or more of said individual multi-quantum-well structures have a different design from other individual multi-quantum-well structures.

10. The nonlinear metasurface structure as recited in claim 1, further comprising:
    a first array of nanoantennas above said multi-quantum-well layer; and
    a ground plane below said multi-quantum-well layer.

11. The nonlinear metasurface structure as recited in claim 1, wherein a voltage is applied across said multi-quantum-well layer to control and shift resonance frequencies in said multi-quantum-well layer.

12. The nonlinear metasurface structure as recited in claim 1, further comprising:
    a ground plane, wherein said multi-quantum-well layer is located on said ground plane; and
    a substrate, wherein said ground plane is located on said substrate.

13. The nonlinear metasurface structure as recited in claim 12, wherein said substrate comprises semiconductor or dielectric material.

14. The nonlinear metasurface structure as recited in claim 12, wherein said ground plane comprises a layer of metal.

15. The nonlinear metasurface structure as recited in claim 12, wherein said ground plane comprises a layer of doped semiconductor.

16. The nonlinear metasurface structure as recited in claim 1, wherein said nanoantennas in said one or more arrays of nanoantennas are made of metal or doped semiconductor.

17. The nonlinear metasurface structure as recited in claim 1, wherein the nonlinear metasurface structure is optimized for second harmonic generation, sum- and/or difference-frequency generation, electro-optic effect, phase-conjugation effect, Raman process or a four-wave mixing process.

18. The nonlinear metasurface structure as recited in claim 1, wherein the nonlinear metasurface structure is optimized for input and/or output beams incident from and/or outcoupled to above and/or below said multi-quantum-well layer.

* * * * *

UNITED STATES PATENT AND TRADEMARK OFFICE
CERTIFICATE OF CORRECTION

PATENT NO.        : 9,733,545 B2
APPLICATION NO.   : 14/814176
DATED             : August 15, 2017
INVENTOR(S)       : Belkin et al.

It is certified that error appears in the above-identified patent and that said Letters Patent is hereby corrected as shown below:

Column 1, under GOVERNMENT INTERESTS please amend the paragraph as follows:
This invention was made with government support under Grant No. 1348049 awarded by the National Science Foundation, Grant Nos. FA9550-10-1-0076, FA9550-11-1-0009 and FA9550-14-1-0105 awarded by the Air Force Office of Scientific Research and Grant No. N00014-10-1-0942 awarded by the Office of Naval Research. The U.S. government has certain rights in the invention.

Signed and Sealed this
Seventeenth Day of April, 2018

Andrei Iancu
*Director of the United States Patent and Trademark Office*